UNITED STATES PATENT OFFICE.

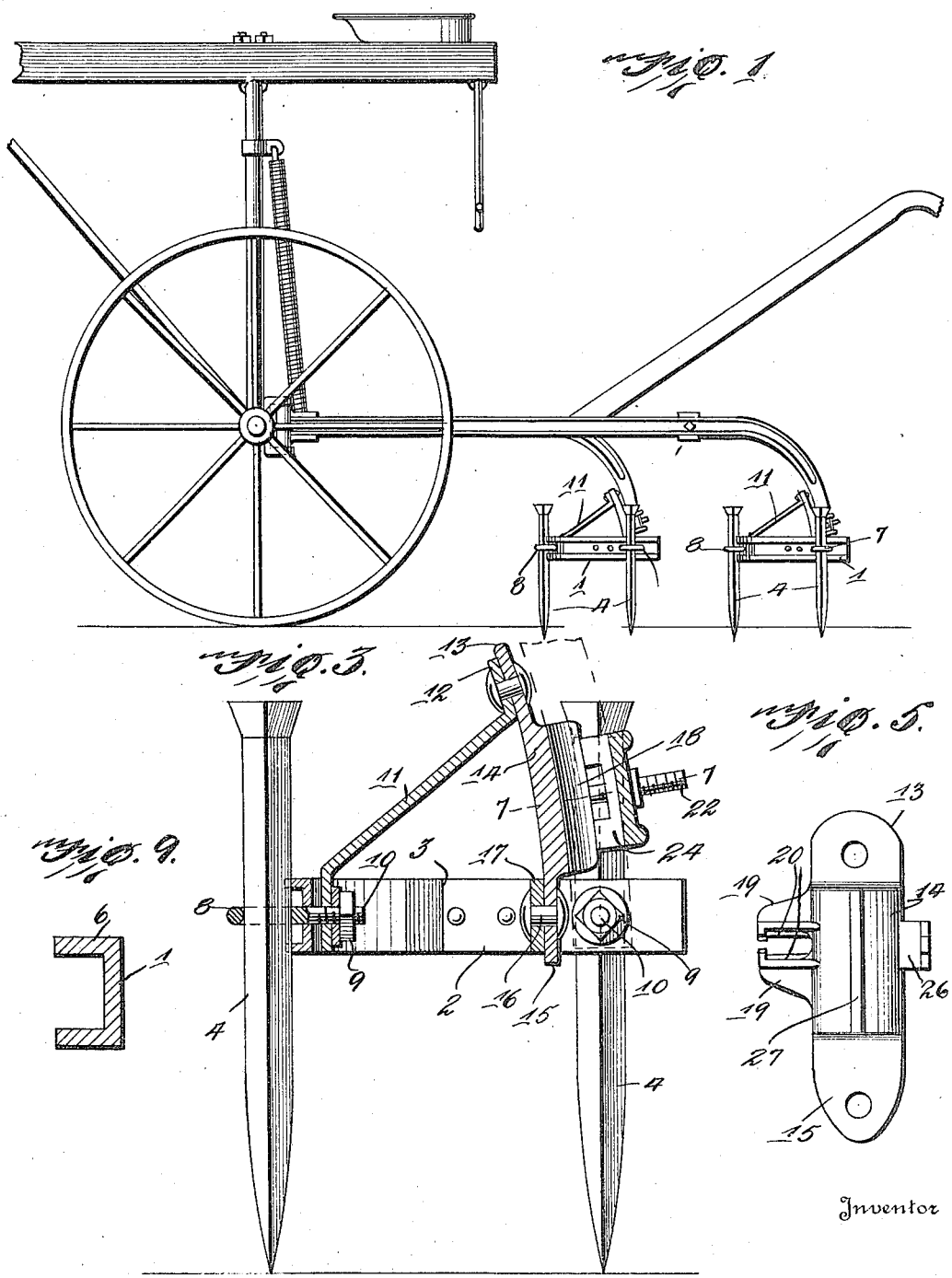

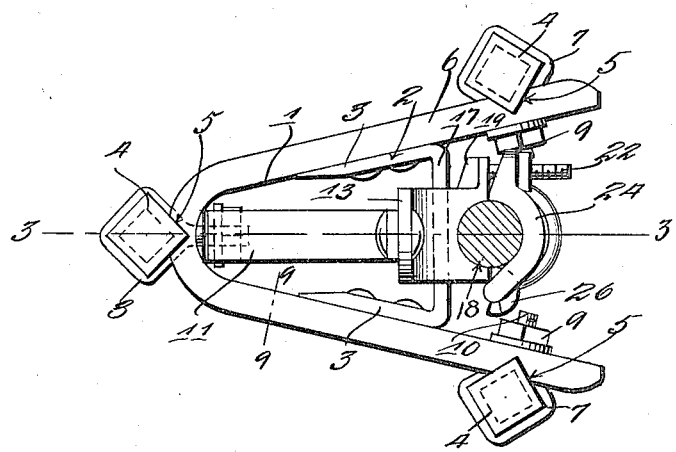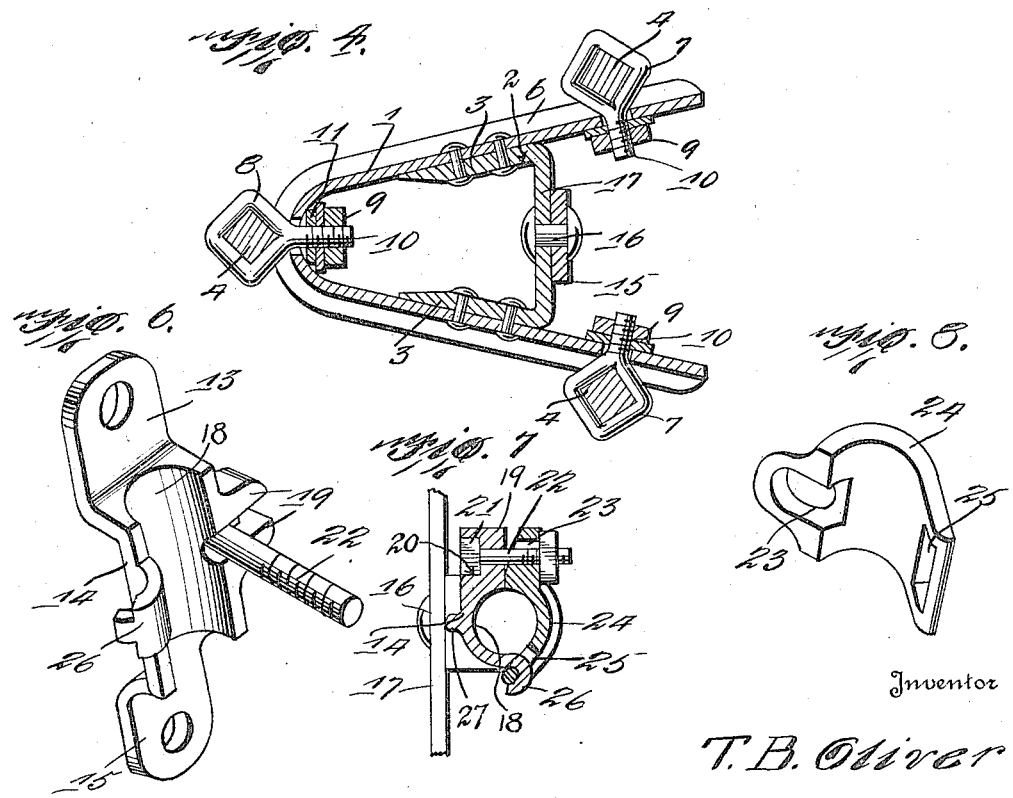

THOMAS B. OLIVER, OF SHELDON, IOWA.

DETACHABLE HARROW-CULTIVATOR.

1,236,344.  Specification of Letters Patent.  Patented Aug. 7, 1917.

Application filed September 22, 1916. Serial No. 121,641.

*To all whom it may concern:*

Be it known that I, THOMAS B. OLIVER, a citizen of the United States, residing at Sheldon, in the county of O'Brien and State of Iowa, have invented certain new and useful Improvements in Detachable Harrow-Cultivators, of which the following is a specification, reference being had therein to the accompanying drawing.

This invention relates to a harrow cultivator and has for its object the production of a simple and efficient mechanism for allowing the cultivator of the harrow type to be attached to the ordinary cultivator frame or supporting mechanism without materially changing the construction of the cultivator frame mechanism.

Another object of this invention is the production of a simple and efficient cultivator, especially adapted for cultivating corn and the like so as to prevent the corn from being covered as the ground or soil is being cultivated.

With these and other objects in view, this invention consists of certain novel constructions, combinations and arrangements of parts as will be hereinafter more fully described and claimed.

In the drawings:

Figure 1 is a side elevation of the cultivator frame showing the harrow cultivator attached thereto.

Fig. 2 is a top plan view of the harrow cultivator, the supporting standard being shown in section.

Fig. 3 is a section taken on line 3—3 of Fig. 2.

Fig. 4 is a central horizontal section through the harrow cultivator.

Fig. 5 is a front elevation of the primary portion of the clamp for attaching the harrow cultivator to the supporting member.

Fig. 6 is a detail perspective of the structure shown in Fig. 5.

Fig. 7 is a transverse sectional view taken on line 7—7 of Fig. 3.

Fig. 8 is a detail perspective of the auxiliary portion of the clamp.

Fig. 9 is a section taken on line 9—9 of Fig. 2.

By referring to the drawings, it will be seen that 1 designates the body of the harrow cultivator which is preferably of a channel structure in cross section as shown in detail in Fig. 9 and this body 1 is preferably formed of a substantially V-shaped formation as clearly illustrated in Fig. 2 of the drawings. A central bracing bar 2 is secured between the diverging side portions of the body 1 and is provided with a plurality of converging arms 3 which are fixedly secured to the inner face of the side portions of the body 1.

A plurality of vertically extending harrow teeth 4 are supported upon the body 1 by having the corners thereof fitting in the substantially V-shaped notches 5 formed upon the periphery of the flange portions 6 of the body 1. Eye-bolts 7 are carried by the respective ends of the side portions of the body 1 as illustrated clearly in Figs. 2 and 4 of the drawings, and an eye-bolt 8 is also carried by the forward portion of the body 1 as illustrated in Figs. 2 and 4 of the drawings. These eye-bolts 7 and 8 are provided with substantially squared sockets for receiving the harrow spikes or fingers 4 and are adapted to firmly hold the harrow spikes or fingers 4 in close engagement with the body 1 and within the V-shaped notches 5 formed in the flanges 6 of the body 1. Suitable nuts 9 are threaded upon the threaded portions 10 of the bolts 7 and 8 for the purpose of firmly holding these eye-bolts in engagement with the body 1.

A rearwardly extending brace 11 is secured to the forward eye-bolt 8 as illustrated clearly in Fig. 3 of the drawings, and this rearwardly extending brace member 11 is provided with a forwardly extending end 12 which forwardly extending end 12 is secured to the upwardly extending end 13 of the primary section 14 of the clamp. This primary section 14 of the clamp is also provided with a depending lip 15 which depending lip 15 is secured by means of the rivet 16 to the transversely extending portion 17 of the bracing bracket 2.

The primary portion 14 of the clamp comprises a body which body is provided with a vertically extending concave channel 18 and is provided near the side thereof with a plurality of laterally extending lugs 19 having ledge portions 20 upon the several faces or edges thereof for the purpose of receiving the head 21 of the tightening bolt 22. The tightening bolt 22 passes through an aperture 23 formed in the auxiliary portion 24 of the clamp. This auxiliary portion 24 is provided with an aperture 25 through which aperture 25 passes a rolled tongue 26 of the primary section 14 of the clamp. This rolled portion 26 passing through the aperture 25 constitutes a hinge for the auxiliary portion 24 of the clamp. As shown in Fig. 5, the primary portion 14 of the clamp is provided with a vertically extending rib 27 formed upon the front face thereof and constituting a brace therefor.

It should be understood that the primary portion 14 of the clamp will not only constitute an efficient means to permit the harrow cultivator to be attached to a support but will also constitute an efficient means for connecting the forwardly extending members 11 thereto and thereby allow the forward end of the body 1 to be forwardly braced or supported.

It should be understood that the harrow spikes or teeth 4 may be adjusted to any desired position with respect to each other to suit the ground over which the device may be passing, thereby allowing the teeth upon one side of the cultivator to dig deeply into the ground when so desired.

What is claimed is:

1. A harrow attachment of the class described comprising a body, a clamp extending vertically of said body, said clamp comprising a primary section and an auxiliary section, means for hingedly connecting said sections together, means for tightening one section upon the other section, a forwardly extending bracing bracket secured to the forward end of said harrow body and engaging the upper end of said clamp for bracing the same, and harrow teeth supporting means carried by said body.

2. A harrow attachment of the class described comprising a body, a clamp carried by said body, said clamp comprising a plurality of sections, means for hingedly connecting said sections together, means for tightening one section upon the other section, a brace connected to the upper end of one of said sections and extending forwardly and being downwardly inclined, and means for securing the forward end of said brace to said body for holding said clamp in a substantially vertical position.

In testimony whereof I hereunto affix my signature.

THOMAS B. OLIVER.

Copies of this patent may be obtained for five cents each, by addressing the "Commissioner of Patents, Washington, D. C."